B. W. Durkee,
Circular Saw Mill,
Nº 55,202. Patented May 29, 1866.

Witnesses
J. J. Peyton
Theodore Lang

Inventor
B. W. Durkee

UNITED STATES PATENT OFFICE.

BRANCH W. DURKEE, OF LIVONIA, ASSIGNOR TO HIMSELF AND J. BURNS WEST, OF LAKEVILLE, NEW YORK.

IMPROVEMENT IN SAWING-MACHINES.

Specification forming part of Letters Patent No. 55,202, dated May 29, 1866.

*To all whom it may concern:*

Be it known that I, B. W. DURKEE, of Livonia, in the county of Livingston and State of New York, have invented new and useful Improvements in Saw-Mills; and I do hereby declare that the following is a full, clear, and exact description of the construction and operation of the same, reference being had to the annexed drawings, making a part of this specification, in which—

Figure 2:
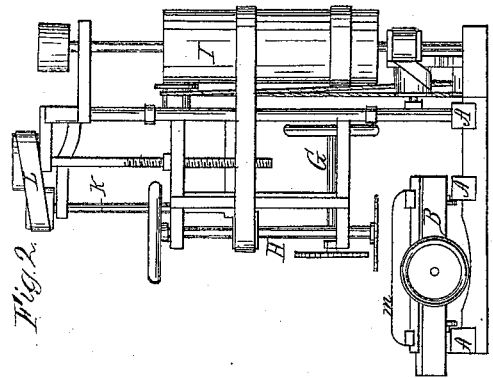
Figure 1:
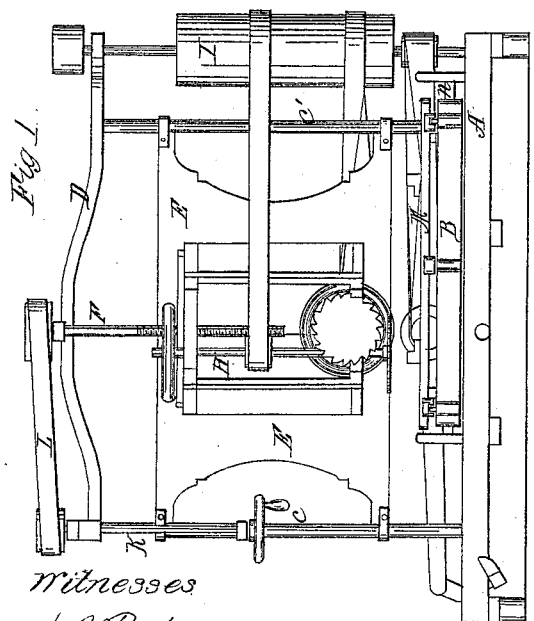
Figure 3:
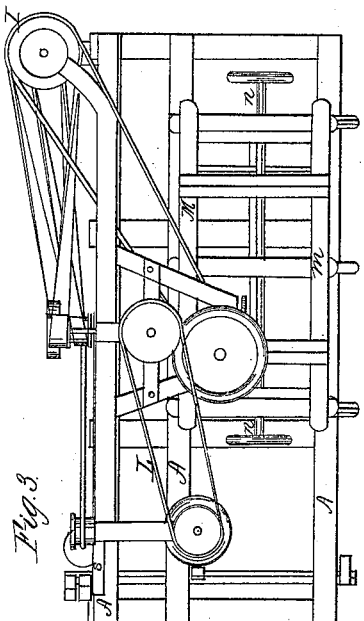

Figure 1 is a side view, in elevation, of my machine. Fig. 2 is an end elevation, and Fig. 3 is a plan view, thereof.

It is the object of my invention to saw directly from the log, piece by piece, stuff of any size desired by once passing the log beneath the saws, such, for example, as handles, chair-rounds, pickets, fence-boards, posts, or scantling, which are thus at once made ready for turning or planing; and to this end my invention consists, first, in mounting so that they cannot clash while in motion one or more circular saws on a horizontal and one or more circular saws on a vertical shaft in a single vertically-adjustable frame; second, in driving a vertical and a horizontal saw-shaft from a single vertical drum when the pulleys on the saw-shaft are fixed, and the saws can have vertical adjustment without throwing the belts of either out of line; third, in giving the saw-frame a vertical adjustment which will at once adapt both the vertical and horizontal saws to each course to be cut from the log; fourth, in so combining two carriages as to give the log a rectilinear reciprocatory and a transverse motion to bring it into proper position for the action of the vertical and horizontal saws; fifth, in so gearing the carriage that it shall be automatically reciprocated in its longitudinal movements.

Suitably-arranged frame-timbers A support a carriage, B, and uprights C and C', which are connected by a top arched bar, D. Between the uprights, and secured thereto by loose straps, a saw-frame, E, is supported by a screw, F. This sliding frame E carries one or more saws on a horizontal arbor, G, and one or more saws on a vertical arbor, H, the saw on this latter arbor being without a collar on the under side, and both saws are driven by belts from a vertical drum, I. The saws are so set—the one in advance of the other— that they can never clash while in motion, and being placed so that their courses intersect, the one cutting horizontally and the other perpendicularly, they must necessarily remove a right-angular piece from the log for every pair of horizontal and vertical saws upon the mandrel on each forward movement of the log, or by increasing the size of the saw on one mandrel it will cut for several saws on the other. The screw F, while holding the saws securely, enables them to have a vertical adjustment, so as to adapt them properly to any sized log or to any level of the log that is reduced in sawing, and the adjusting-screw may be rotated through the shaft K and belt L, or otherwise. The arbor H is driven by an open and the arbor G by a quarter-twist belt, and both derive motion from the upright drum I. Thus, whatever the position of the saws in relation to the log, the driving-belts will, when in motion, always take the proper position on the drum and not be liable to slip off from the fixed pulleys on the arbors.

By arranging both saws in one frame I am enabled, in fixing the height of one saw, to enable both to cut the sized stuff desired without a separate adjustment for each in reducing a single log to stuff of a uniform size.

The ordinary carriage B runs on a proper track on the frame-timbers A, and supports a second carriage, M, which moves with and transversely upon it, the latter motion being imparted from pinions on the shaft N working into racks on the under side of the second carriage, which carries head-blocks and dogs to hold the log, while the ordinary carriage may derive its longitudinal movements from the usually-employed mechanism.

Figure 4:
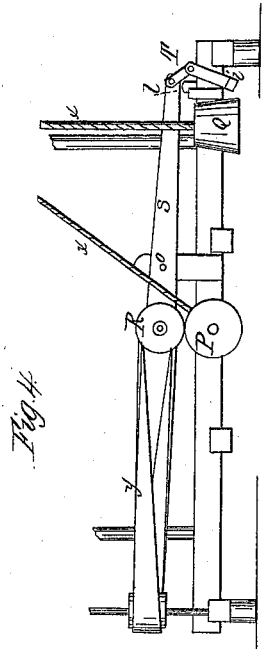

I render the reciprocatory movements of the ordinary carriage automatic by the following mechanism, which is illustrated in Fig. 4 of the drawings, being a broken section of the rear side of the frame: The pulley P is attached to the shaft that carries the pinion, which reciprocates the main carriage longitudinally by gearing into a rack on the under side of the carriage. This pulley P has a collar between it and the frame, to which the cord *x* is attached, and the cord *x* carries a weight, Q, at its opposite end, and the forward motion of the carriage winds this cord upon its collar and raises the weight Q. The pulley P derives its rotation from the friction of a pulley, R, driven by the belt y on a pulley on the main driving-shaft. The pulley R rotates on a stud secured to the lever S, which is fulcrumed at o and united to a rock-shaft, i, by a toggle-joint, T. The rock-shaft i carries a standard, l, in front of the carriage. Now, when the toggle-joint is straight the pulley R on the opposite end of the lever is brought into connection with the pulley P and gives the carriage its forward motion, winding up the cord and raising the weight. The carriage continues to move forward until it strikes the standard l, which bends the toggle and releases the driving-pulley from contact with the pullley P. A cord or chain is attached at one end to the standard l and at the other to the carriage, and is adjusted in length to suit the length of traverse required for the carriage. Thus when the driving-pulley is released the weight descends and unwinds the cord from its collar, running the carriage back until the cord or chain between the carriage and standard l is tightened, when at once the toggle is again straightened and the forward movement of the carriage renewed.

What I claim as my invention, and desire to secure by Letters Patent, is—

1. The arrangement, in an adjustable frame of one or more vertical with one or more horizontal saws, substantially in the manner and for the purpose set forth.

2. The combination of vertical and horizontal saws in an adjustable frame with the driving-drum, arranged and operating in the manner and for the purpose set forth.

3. The combination and arrangement of the main carriage with the toggle-lever mechanism and weight to render its reciprocating motions automatic, substantially as set forth.

BRANCH W. DURKEE.

Witnesses:
GEO. W. SILL,
WM. H. SHEPARD.